United States Patent [19]

Holz

[11] 4,031,543
[45] June 21, 1977

[54] COMMUNICATION SYSTEM
[75] Inventor: George E. Holz, North Plainfield, N.J.
[73] Assignee: Berkeley Varitronics Systems, Edison, N.J.
[22] Filed: Mar. 11, 1974
[21] Appl. No.: 450,048
[52] U.S. Cl. .................................. 358/86; 358/84; 325/31; 325/308; 340/408; 343/6.5 R
[51] Int. Cl.² .................................................. H04N 7/16
[58] Field of Search ............ 178/DIG. 15, DIG. 13, 178/5.1; 325/31, 308, 53; 340/411, 201 R, 202, 408; 179/15 BA; 343/6.5 R; 358/86, 84

[56] References Cited
UNITED STATES PATENTS

| 2,719,188 | 9/1955 | Pierce | 179/15 BA |
|---|---|---|---|
| 3,058,065 | 10/1962 | Freeman | 325/31 |
| 3,372,233 | 3/1968 | Currey | 325/31 |
| 3,665,311 | 5/1972 | Gargini | 178/DIG. 13 |
| 3,716,654 | 2/1973 | Hendrickson | 178/5.1 |
| 3,733,430 | 5/1973 | Thompson et al. | 325/31 |
| 3,733,930 | 5/1973 | Thompson | 178/5.1 |
| 3,786,424 | 1/1974 | McVoy | 340/151 |
| 3,801,735 | 4/1974 | Gabriel | 178/DIG. 13 |

Primary Examiner—Robert L. Richardson
Assistant Examiner—Edward L. Coles
Attorney, Agent, or Firm—Robert A. Green

[57] ABSTRACT

The communication system, which is especially useful for pay TV, comprises a central station and a plurality of remote stations. The central station includes means for transmitting pay TV programs to the remote stations, and each remote station includes a circuit for transmitting information signals to the central station. Each of the remote stations is adapted to transmit its information signals randomly to the central station so that a relatively large number of remote stations can operate, without interference, with a single central station. In one arrangement, the central station directly reads the information in the received signals to determine the status of the remote station. In a second system, the central station receives randomly transmitted signals from each room, and it also receives signals from the program transmitter. The central station equipment includes a computer which detects time or phase coincidence between the signal from the program transmitter and that from the remote stations, and uses that information as desired.

34 Claims, 7 Drawing Figures

COMMUNICATION SYSTEM

BACKGROUND OF THE INVENTION

The principles of the invention are particularly applicable to pay TV systems wherein TV programs are transmitted from a central station to a plurality of remote stations, and it is desired to determine in simple fashion whether a subscriber has selected and received a program, and, if this occurs, then the system automatically bills the subscriber for the program. Systems are known for performing this function; however, such systems are either excessively complex and expensive and do not operate with suitable simplicity, or they are not sufficiently automatic and require excessive human participation.

SUMMARY OF THE INVENTION

Briefly, the invention comprises a transmitter for sending a TV program from a central station to a plurality of remote stations where the program can be accepted, if desired. Each remote station includes a transmitter for randomly transmitting information relating to the status of the remote station, particularly as to whether a pay program has been selected. The central station includes means for receiving and registering the information received from the remote stations and providing the appropriate response including automatically billing the remote station, if proper.

DESCRIPTION OF THE PREFERRED EMBODIMENTS

Figure 1:
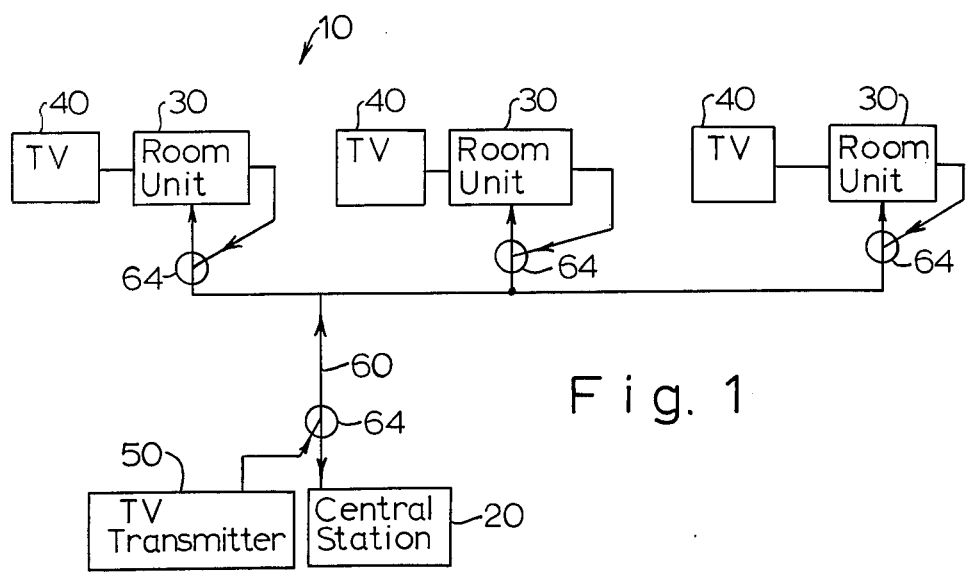
FIG. 1 is a schematic representation of a communications system embodying the invention.

Referring to FIG. 1., the system 10 of the invention includes a central station 20 and a plurality of subscriber units 30, each associated with a subscriber TV set 40. Conventional tape or film TV transmitting apparatus 50 is also provided in association with the central station. The usual MATV/CATV cable 60 is used to interconnect the various parts of the system through directional taps 64 and appropriate TV splitters and the like, as is well known.

Each subscriber unit 30 includes a digital data encoder and a transmitter for transmitting a digital word, including the address of each TV set and its status, to the central station 20 where the digital word is read and recognized and processed by the central station circuitry. Each subscriber unit, while essentially identical to all others, includes circuit means to permit its transmitter to transmit information in the form of a digital word at a sufficiently different time than every other transmitter so that interference between subscriber unit transmissions is minimied. As a further precaution, the central station equipment is normally programmed not to bill a subscriber or to perform some other function before it receives a selected number of transmissions of identical information from a subscriber unit.

The following description of specific features of the invention are related, for purposes of illustration, to a motel pay TV system wherein the subscriber units 30 are found in the motel rooms and are called room units, and a TV program transmitter 50 and central station 20 are found in the motel office area.

Figure 2:
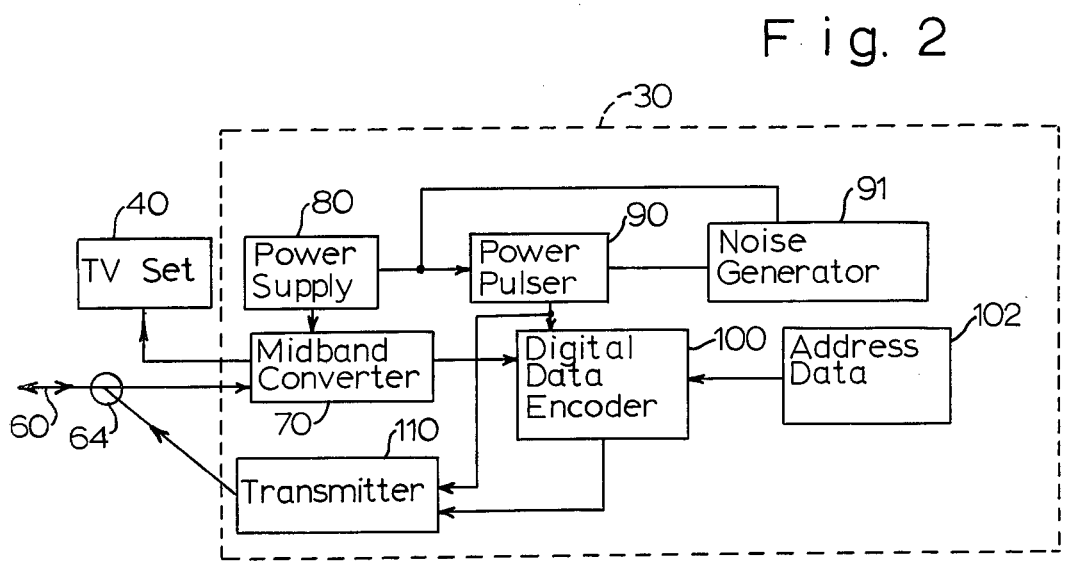
FIG. 2 is a schematic representation of a more detailed portion of the system of FIG. 1.

A typical room unit 30 is shown in more detail in FIG. 2 and includes a midband converter 70 coupled to the motel MATV cable 60 and adapted to be tuned to receive the TV transmissions from one or more TV transmitters 50 on selected channels. The converter 70 has its output coupled into the TV set 40, as is well known in the art, to couple the received signals thereto.

The room circuit also includes a digital encoding circuit 100 of any suitable type which is coupled to the midband converter so that a digital bit or bits can be entered therein representing the channel to which the converter is tuned. In addition, the address of the room TV set is entered in the encoding unit 100 by means represented by block 102. Other data could also be entered in encoder 100, as is well known in the art. In one arrangement, a 16-bit code was used including three synch bits, 10 bits for address, and three separate bits to represent the channel selected or other data.

The room unit 30 also includes a digital transmitter 110 coupled to the output of the encoder 100. The transmitter is coupled to the MATV cable 60 through a directional tap 64 and then to the central station where it is processed in a manner to be described.

Figure 3:
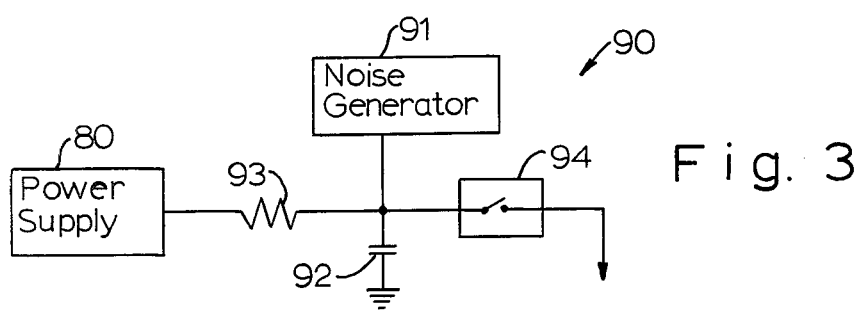
FIG. 3 is a schematic representation of a portion of the apparatus shown in FIG. 2.

Room unit 30 also includes a power supply 80 and a power pulser or switching circuit 90, to which the power supply is connected along with a noise generator 91. Typically, the power pulser includes, as shown in FIG. 3, a capacitor 92 coupled through a resistive path 93 to the power supply and through a second path to the noise generator 91. The power pulser also includes circuit means 94 with functions as a switch which is closed when the capacitor 92 is charged to a predetermined level and through which power is coupled to the transmitter 110, the digital encoder 100, and to any other parts of the system which require power during the time of operation of the transmitter. This is the transmission time for a digital word.

Figure 4:
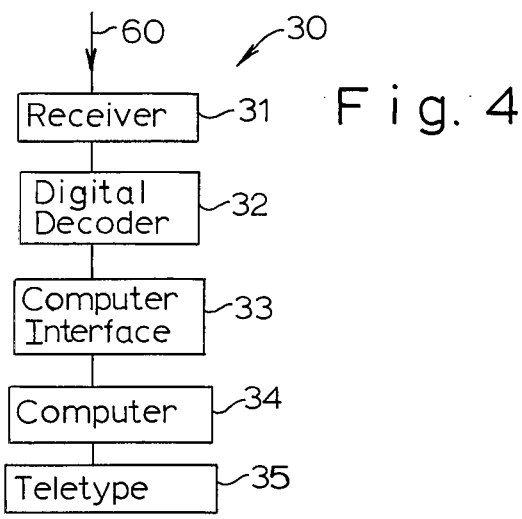
FIG. 4 is a block diagram of a portion of the system of FIG. 1 in greater detail.

Referring to FIG. 4, the central station 20 of the system 10 includes a receiver 31, a digital decoder 32, a computer interface module 33 which is essentially a serial-to-parallel converter for the digital word, a computer 34, and a readout such as a teletype 35.

In operation of the system of the invention 10, in each room unit 30, the data encoder 100 is set by the converter 70 to generate digital bits representing the pay channel to which the room TV set is tuned, if it is so tuned, and it is set by circuit 102 to include a digit or digits representing the room address. With the power supply 80 and noise generator 91 feeding charge to the capacitor 92, the capacitor gradually charges, and, when it reaches a predetermined level determined by the various parameters of the power pulser circuit 90, the pulser switches on and couples power to the transmitter 110 and the digital encoder 100, and the appropriate digital word is transmitted, in serial form, to the central station on cable 60.

As determined by the components of the room unit, the transmitter 110 is triggered, typically every two to five seconds, or so, to transmit the digital word to the central station. The information from each room unit is received, decoded, changed from serial to parallel, for example, and stored by the computer. The computer can be programmed so that, if the pay TV information from a room is received steadily for, say ten minutes, then an entry is made to bill the room occupant, or it is printed out on the teletype, or some other operation can be performed.

Figure 5:
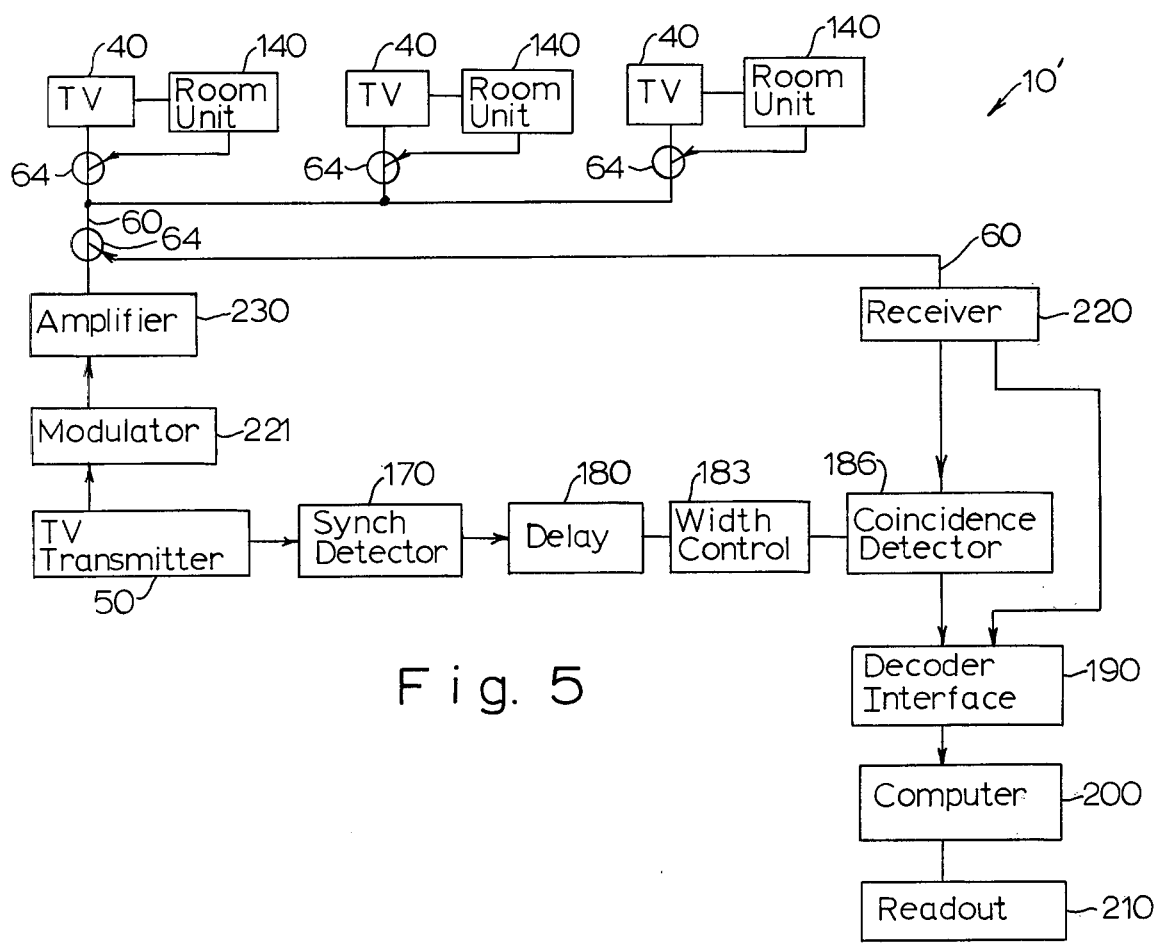
FIG. 5 is a schematic representation of another communications system embodying principles of the invention.

Referring to FIG. 5, a system 10' embodying a modification of the invention includes a room unit 140 associated with each room TV set 40, and, in this case, the TV programs are transmitted directly to the TV sets in conventional fashion, and not through a converter, as in system 10. Thus, the system 10' includes, at the central station, TV transmitter 50 coupled through a modulator 221, which serves to place the video signal on a selected TV channel frequency, an amplifier 230, and any other required circuits to the cable 60 which feeds the TV progrms to all of the room TV sets. At the central station, the TV transmitter 50 is also coupled through a conventional synch detector circuit 170 which detects the horizontal synch signals generated at the transmitter 50 and couples them through a suitable delay circuit 180, if required, to compensate for delays in transmisson from the room units to the central station. The delay circuit is coupled to a width control circuit 183 which is used to adjust the width or time duration of the signals received from the synch detector, and the output of the width control circuit is coupled to one input of a coincidence detector circuit 186 (the other input of which comes from the room units 140), the output of which is coupled through a computer interface 190, which is a decoder circuit, for converting digital words from serial to parallel form, to a computer 200. The output of the computer is coupled to a suitable display or recording device such as a teletype machine 210.

The cable 60 is connected to the input of a receiver 220, and the output of the receiver is coupled to the coincidence detector 186 to provide the second input thereto which is to be compared with the input from the synch detector 170.

Figure 6:
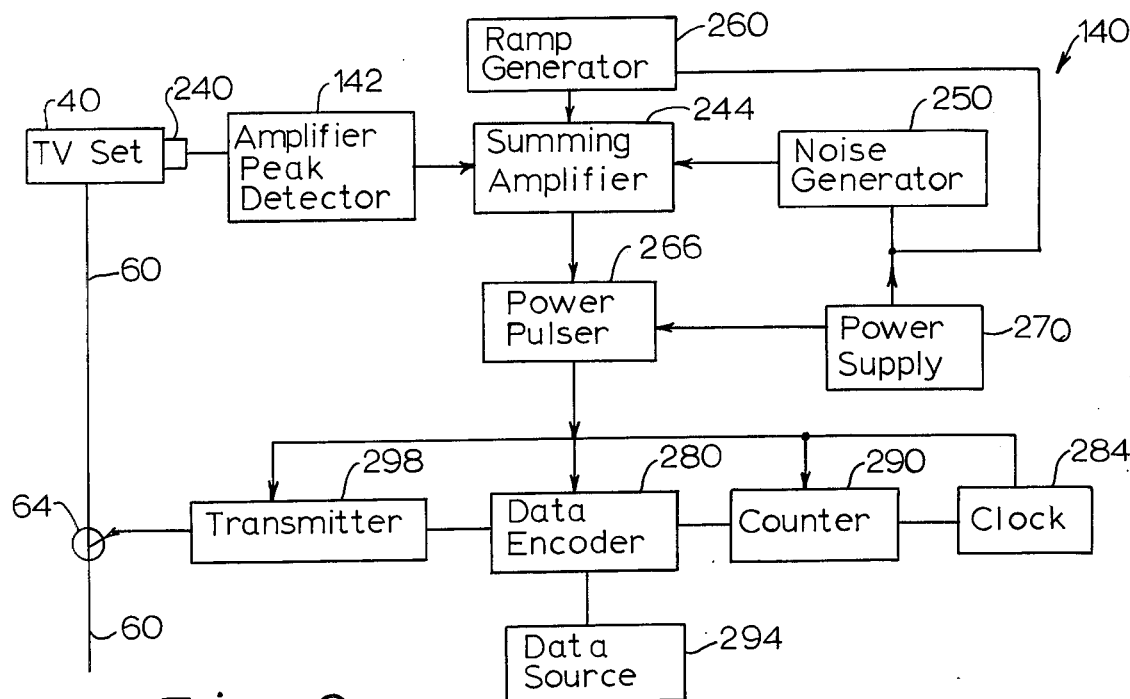
FIG. 6 is a more detailed representation of a portion of the system of FIG. 5.
Figure 7:
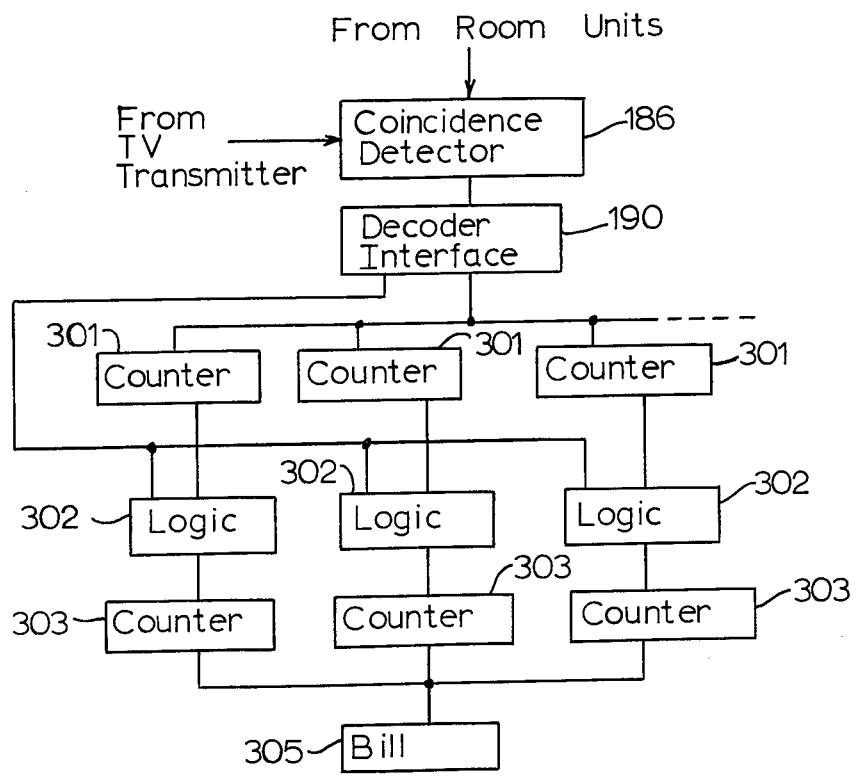
FIG. 7 is a more detailed representation of another portion of the system of FIG. 5.

Referring now to the room circuit 140, which is found in each motel room, such circuit is shown in block form in FIG. 6 and includes an electrostatic pickup or sensor 240 in the form of a wire, plate, pickup coil, or the like operatively coupled to the TV set in any suitable manner, for example, by being positioned inside or outside the TV cabinet. The sensor is not connected directly into the TV circuit. The sensor 240 picks up the horizontal synch signals of the received picture signal, and the associated circuit elements are arranged to respond only to the synch pulses.

The sensor 240 is connected to an amplifier-peak detector 242 having a high input impedance and means for developing clean, sharp pulses from the synch pulses which are picked up by the sensor. The output of amplifier 242 is connected to a summing circuit 244, along with the output of a noise generator 250 and a ramp or sawtooth signal generator circuit 260. The circuit 260 developes a slowly rising ramp signal which repeats at regular intervals, e.g., every two seconds, and the noise generator develops a completely random, slowly varying signal. The output of the summing amplifier 244 is connected to a power pulser 266, generally of the type described above, which pulses on the system power supply 270 in response to a selected output level from the summing amplifier, whereby power is connected to the other circuit elements as required during an operating cycle.

The room circuit 140 also includes a digital data encoder and data selector 280 which is driven by a binary-coded decimal counter 290 which is operated by a clock 284. Digital data bits representing room address and the like are set into the data selector by any suitable means well known in the art and represented by block 294. Typically, as above, the data sorce 294 includes sixteen status indicator positions which can be set into, or can be scanned by, the data encoder 280. The output of data encoder 280 is fed into a pulse code modulated transmitter 298 which is connected to the cable 60, and thus can transmit a signal, comprising digital bits, back to the receiver 220 at the central station 30, as described above with respect to system 10.

System 10' shown in FIGS. 5 and 6 operates as follows. The picture signal received at the room TV set 40 includes horizontal synch pulses which are picked up by the sensor 240 and coupled into the amplifier 42 and then into the summing amplifier 244. The output of the noise generator 250, a slowly varying random signal, and the output of the ramp generator 260 are also fed into the summing amplifier 244 which is arranged to switch on the power pulser 266 when the input signals combine to reach a predetermined voltage level. The is level is reached and the circuit fires when one of the sharp synch pulses is added to the other two voltage waves. When the output of the summing amplifier 244 operates the pulsing circuit 266, the power supply 270 provides power for the various operating portions of the circuit as required. When the power is turned on, the clock 284 and counter 290 combine to scan the data encoder 280 and to generate a digital word comprising a series of pulses or binary-coded decimal bits which include information relating to the channel being watched on the TV set, the room address and the like, and this digital word is transmitted by transmitter 298 over cable 60 to the circuit elements at the central station module. It is noted that the instant at which this transmission takes place is determined by a synch pulse being added to the ramp signal and the noise signal. In one embodiment of the invention, the transmission time for a digital word was 160 microseconds.

At the central station module, the signal sent by the transmitter 298 is fed into the receiver 220 and into the coincidence detector 186 where it coincides with the synch pulse transmitted thereto from circuit 170. The leading edge of the received digital word is compared with the synch signals received from the program transmitter 50 to check for time coincidence. It is to be understood that the system may be arranged to check phase coincidence, or the two signals may be related in other suitable manner. In coincidence exists, the coincidence detector provides an output signal which is registered in the computer 200. This means that the occupant of that room is viewing the TV transmission, and he will be billed for this viewing by suitable computer programming. It is noted that the width of the synch pulses provided by width control circuit 183 determines the time period over which the two signals must overlap to represent coincidence and to provide an output from coincidence circuit 186. Other disposition can be made of the information thus received.

Again, as described above, the computer program can be arranged so that billing or other function is performed only after a plurality of identical transmissions are received from any one room unit to indicate that a particular program is being watched.

Those skilled in the art will be able to program a computer to enter information relating to whether a pay program is watched by a room unit, and then to use that information in some way for automatic billing. In one suitable arrangement, each digital word out of the interface circuit 190 which contains a signal bit which signifies that a pay channel is being watched is entered in a first counter 301, there being one such first counter for each room unit. Each first counter has an eight-count capacity, and, when eight counts have been received, it means that the room unit has selected a pay TV channel. When a first counter is filled, a second counter 303 (one for each room unit) is enabled through suitable logic circuits 302, and, as long as the same digital words are received, a count is entered therein every thirty seconds for a total of ten minutes, and, at the end of ten minutes, the second counter provides an output signal to billing apparatus 305 which causes the room in question to be billed for the program being watched. With this arrangement, a room is permitted ten minutes of free watching before billing takes place.

It is clear that, if system 10' is used to monitor more than one program channel, then the horizontal synchronizing signals of each program channel must occur at different times than those of every other channel.

Those skilled in the art can readily provide the various components of the systems described above, such components being well known and readily available. For example, the midband converter 70, is a circuit module which is well known and is widely used in cable television to convert signals of various frequencies to frequencies usable by commercial television sets. A typical cable TV system using a converter is shown in U.S.P. at No. 3,769,579 and in U.S.P. at No. 3,665,311 (element 28), and converters are sold by AEL Communications Corporation and Oak Industries, Inc.

Another system element, the digital data encoder, is also well known and readily available. In one system, the data encoder consisted of 1 two 74150 integrated circuit modules, made by Texas Instruments, Signetics, and others and shown, for example, in Signetics' DIGITAL LINEAR MOS DATA BOOK, 1974, and Texas Instruments' THE TTL DATA BOOK for Design Engineers 1973, and 2 a type 7493 divide-by-16 counter made by Texas Instruments, Signetics, National Semiconductor, and Fairchild. Such encoders, also known as multiplexers, are also shown and described in Howard W. Sams' Publication 20967, TRANSISTOR-TRANSISTOR LOGIC, 1973, on pages 66 and 67, and in U.S. Pat. No. 3,786,424.

What is claimed is:

1. A communiction system comprising
a central station and a plurality of remote stations,
a program transmitter at said central station for transmitting program signals representing said programs to all of said remote stations,
second means at each of said remote stations for transmitting information signals to said central station at generally regular but random intervals whereby a relatively large number of remote stations can communicate with a central station without said information signals interfering with each other, said second means including a signal transmitter, switch means for turning on said transmitter at generally regular but slightly random intervals, and a summing amplifier coupled to said switch means,
said summing amplifier being adapted to be charged to a predetermined voltage level at which it operates and switch means, and
a plurality of signal-generating means coupled to said summing amplifier including means for selecting portions of said program signals, a ramp voltage generator, and a random signal generator.

2. The system defined in claim 1 wherein each remote station includes a television receiver and said program signals are television signals which include horizontal synchronizing signals and said means for selecting portions of said program signals includes electrostatic pickup apparatus positioned close to the portion of said television receiver where said horizontal synchronizing signals are generated, said electrostatic pickup apparatus sensing said horizontal synchronizing signals.

3. The system defined in claim 2 wherein said electrostatic pickup apparatus comprises a conductive member positioned close to the chassis of the television receiver and generating electrical impulses, with each horizontal synchronizing signal received by said receiver.

4. The system defined in claim 3 wherein said conductive member is a wire.

5. The system defined in claim 1 wherein said program signal is a television signal which includes horizontal synchronizing signals, and said portions of said program signals are said horizontal synchronizing signals.

6. The system defined in claim 5 and including means at said central station for comparing said horizontal synchronizing signals with the same horizontal synchronizing signals received from each of said remote stations.

7. The system defined in claim 6 wherein said second means includes a television receiver which receives said television signal, and a conductive member coupled to said television receiver and sensing said horizontal synchronizing signals electrostatically.

8. A communication system comprising
a central station and a plurality of remote stations,
a television program transmitter at said central station for transmitting television signals to all of said remote stations, said television signals including repetitive horizontal synchronizing signals,
first means for detecting said horizontal synchronizing signals at said transmitter,
second means at each of said remote stations including a signal transmitter for transmitting information signals to said central station at generally regular but random intervals whereby a relatively large number of remote stations can communicate with a central station without said information signals interfering with each other,
said second means further including
a power supply,
a power pulser comprising switching means for switching power from said power supply to said signal transmitter, and
a summing amplifier coupled to said power pulser and adapted to be charged to a predetermined voltage level at which it turns on said power pulser, said summing amplifier being coupled to and receiving electrical signals from a sawtooth wave generator, means for extracting said horizontal synchronizing signals, and a random signal generator, and third means at said central station for receiving and comparing said horizontal synchronizing signals from said program transmitter with said information signals from said remote stations.

9. A communication system comprising a single central station and a plurality of remote station, said central station being adapted to transmit signals to and receive signals from all of said remote stations, said remote stations transmitting only to said central station but not to any of said remote stations, first means at said central station for transmitting the same first signals to all of said remote stations substantially simultaneously, each remote station including (1) first means for receiving and selectively utilizing or not utilizing said first signals from said central station and (2) second means for transmitting second signals only to said central station but not to any other of said remote stations, said second signals including information concerning the address of said remote station and information signifying receipt and utilization of said first signals, all of said remote stations, which receive and utilize said first signals, transmitting their second signals to said central station repetitively, and second means at said central station for receiving said electrical signal information and registering said signal information for use in a utilization device at said central station.

10. The system defined in claim 9 wherein said first signals and said second signals are transmitted along the same conductive path from the central station to each remote station and from each remote station to the central station.

11. The system defined in claim 9 wherein said second means includes a transmitter circuit and switching means for switching on said transmitter.

12. The system defined in claim 9 and including in said second means a source of digital information including a plurality of bits defining the address of the remote station and its status.

13. The system defined in claim 9 and including a source of digital bits coupled to said transmitter whereby a digital word can be transmitted thereby.

14. A communication monitoring system comprising a central station and a plurality of remote stations and including means forming a communication path from said central station to each remote station and from each remote station to only said central station but to other remote stations, each said remote station including (1) a device whose state is to be monitored, the state to be monitored being representable by an electrical signal, (2) a transmitter for transmitting electrical signal information including said signal to said central station, and (3) a source of randomly varying electrical signal, said transmitter including means causing it to transmit said electrical signal information repetitively at generally regular but slightly varying intervals only to said central station but not to said remote stations, all of the transmitters transmitting said electrical signal information to said central station at generally regular but slightly varying intervals, and means at said central station for receiving said electrical signal information and registering said signal information for use in a utilization device at said central station.

15. A communication system comprising a single central station and a plurality of remote stations, said central station being adapted to transmit signals to and receive signals from each remote station, first means at said central station for transmitting the same first signals to all of said remote stations, each remote station including (1) first means for receiving and selectively utilizing or not utilizing said first signals from said central station and (2) second means for transmitting second signals only to said central station but not to any other remote station, said second signals including information concerning the address of said remote station and information denoting receipt and utilization of said first signals, said second means including circuit elements for switching on said second means when said first signals are utilized to transmit a plurality of said second signals at substantially fixed time intervals having small variations in the time that transmission is initiated, the time at which transmission is initiated being determined in part by said first signals, all of said remote stations transmitting their second signals repetitively to said central station, and third means at said central station for receiving said second signals and registering said second signals for use in a utilization device at said central station.

16. The system defined in claim 15 wherein said third means at said central station includes means for counting said second signals to accumulate a predetermined total count which operates said utilization device.

17. A communication system comprising a central station and a plurality of remote stations, said central station being adapted to transmit signals to and receive signals from each remote station, first means at said central station for transmitting the same television signals to all of said remote stations substantially simultaneously, each remote station including a television receiver having means for receiving and selectively utilizing or not utilizing said television signals, second means including circuitry for detecting receipt of said television signals, a transmitter for transmitting only to said central station, but not to any remote station, second signals including information concerning the address of said remote station and information denoting receipt and utilization of said television signals, and control means for switching on said transmitter to transmit a plurality of said second signals at substantially fixed intervals having small variations in the time that transmission is initiated, said small variations permitting the determination of the specific remote station from which a specific second signal is transmitted, all of said remote stations transmitting their second signals repetitively to said central station.

18. The system defined in claim 17 wherein said television signals include horizontal synchronizing pulses and said second means includes electrostatic pickup apparatus positioned close to the portion of a television receiver at which said horizontal synchronizing pulses are generated, said electrostatic pickup apparatus sensing said horizontal synchronizing signals and generating pulses therefrom.

19. The system in claim 18 wherein said electrostatic pickup is a wire.

20. A communication system comprising
a central station and a plurality of remote stations, said central station being adapted to transmit signals to and receive signals from each remote station,
first means at said central station for transmitting the same first signals to all of said remote stations,
each remote station including first means for receiving and selectively utilizing or not utilizing said first signals from said central station and second means for transmitting second signals only to said central station, but not to any other remote station, said second signals including information concerning the address of said remote station and information denoting receipt and utilization of said first signals, all of said remote stations transmitting their second signals repetitively to said central station, and
signal comparing circuitry at said central station for comparing the signals transmitted by said central station with said second signals whereby determination can be made of the remote station which transmitted a second signal.

21. The system defined in claim 20 wherein said first signals and said second signals are transmitted along the same conductive path from the central station to each remote station and from each remote station to the central station.

22. The system defined in claim 20 wherein said second means includes a transmitter circuit and switching means for switching on said transmitter.

23. A communication system comprising
a single central station and a plurality of remote stations, said central station being adapted to transmit signals to and receive signals from all of said remote stations, said remote stations transmitting only to said central station but not to any of said remote stations,
first means at said central station for transmitting first signals to all of said remote stations,
each remote station including first means for receiving said first signals from said central station and second means for transmitting second signals only to said central station but not to said remote stations, said second signals including information concerning the address of said remote station and information signifying receipt of said first signals, and
second means at said central station for receiving said electrical signal information and registering said signal information for use in a utilization device at said central station, said second means including a transmitter circuit and switching means for switching on said transmitter circuit, said switching means comprising a capacitor, and both a power supply and source of randomly varying signals coupled to and charging said capacitor, said power supply being coupled to and turning on said transmitter when said capacitor is charged to a predetermined voltage level.

24. A communication system comprising
a single central station and a plurality of remote stations, said central station being adapted to transmit signals to and receive signals from all of said remote stations, said remote stations transmitting only to said central station but not to any of said remote stations,
first means at said central station for transmitting first signals to all of said remote stations,
each remote station including first means for receiving said first signals, from said central station and second means for transmitting second signals only to said central station but not to said remote stations, said second signals including information concerning the address of said remote station and information signifying receipt of said first signals, and
second means at said central station for receiving said electrical signal information and registering said signal information for use in a utilization device at said central station, said second means including a transmitter circuit and switching means for switching on said transmitter circuit, said switching means comprising a summing circuit to which are coupled a source of a defined ramp signal, a source of a randomly varying signal and a source of defined pulses, said summing circuit operating to switch on said transmitter when the signals received thereby sum to a predetermined level.

25. The system defined in claim 24 wherein said pulses comprise television horizontal synchronization pulses.

26. The system defined in claim 24 wherein said pulses comprise television horizontal synchronization pulses.

27. A communication system comprising
a central station and a plurality of remote stations, said central station being adapted to transmit signals to and receive signals from each remote station,
first means at said central station for transmitting signals to all of said remote stations,
each remote station including first means for receiving said signals, from said central station and second means for transmitting second signals only to said central station, but not to any other remote station, said second signals including information concerning the address of said remote station and information denoting receipt of said first signals, and
signal comparing circuitry at said central station for comparing the signals transmitted by said central station with said second signals whereby determination can be made of the remote station which transmitted a second signal,
said second means including a transmitter circuit and switching means for switching on said transmitter circuit, said switching means comprising a capacitor, and both a power supply and a source of random power are coupled to and charge said capacitor, said power supply being coupled to and turning on said transmitter when said capacitor is charged to a predetermined voltage level.

28. A communication system comprising
a central station and a plurality of remote stations, said central station being adapted to transmit signals to and receive signals from each remote station, first means at said central station for transmitting signals to all of said remote stations, each remote station including first means for receiving said signals, from said central station and second means for transmitting second signals only to said central station, but not to any other remote station, said second signals including information concerning the address of said remote station and information denoting receipt of said first signals, and signal comparing circuitry at said central station for comparing the signals transmitted by said central station with said second signals whereby determination can be made of the remote station which transmitted a second signal, said second means including a transmitter circuit and switching means for switching on said transmitter circuit, said switching means comprising a summing circuit to which are coupled a source of a defined ramp signal, a source of a randomly-varying signal and a source of defined pulses, said summing circuit operating to switch on said transmitter when the signals received thereby sum to a predetermined level.

29. The system defined in claim 28 wherein said pulses comprise television horizontal synch pulses.

30. The system defined in claim 28 and including a signal processing path for each remote station coupled to the output of the signal comparing circuitry, each signal processing path including counter means for continually registering counts as long as television signals are received by its remote station, said counter means providing a billing output signal after it has received a predetermined number of said counts.

31. The system defined in claim 28 wherein said pulses comprise television horizontal synch pulses.

32. The system defined in claim 28 and including a signal processing path for each remote station coupled to the output of the signal comparing circuitry, each signal processing path including counter means for continually registering counts as long as television signals are received by its remote station, said counter means providing a billing output signal after it has received a predetermined number of said counts.

33. The system defined in Claim 14 and including a circuit for switching on each transmitter relatively randomly comprising a capacitor, and a power supply and a noise source coupled to said capacitor to charge said capacitor, said capacitor being coupled to said transmitter to energize said transmitter when the charge on said capacitor reaches a predetermined level.

34. The system defined in Claim 14 wherein said means at said central station includes a receiver for receiving a digital word comprising a plurality of bits of information, a counter coupled to said receiver, said counter having a predetermined count capacity, and a second counter coupled to said first counter through logic circuit elements, said second counter receiving a count periodically from said first counter, the output of said second counter being coupled to utilization apparatus which is energized thereby when said second counter receives a predetermined number of count signals.

* * * * *